(12) United States Patent
Kawai et al.

(10) Patent No.: US 9,657,873 B2
(45) Date of Patent: May 23, 2017

(54) THREADED JOINT FOR PIPES

(75) Inventors: Takamasa Kawai, Handa (JP);
Kazunari Takahashi, Handa (JP);
Hiroshi Chikatsune, Handa (JP);
Masaki Yoshikawa, Handa (JP); Jun Takano, Handa (JP); Takuya Nagahama, Houston, TX (US);
Masateru Ueta, Handa (JP); Osamu Sonobe, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 257 days.

(21) Appl. No.: 14/001,944

(22) PCT Filed: Feb. 24, 2012

(86) PCT No.: PCT/JP2012/055292
§ 371 (c)(1),
(2), (4) Date: Dec. 30, 2013

(87) PCT Pub. No.: WO2012/118167
PCT Pub. Date: Sep. 7, 2012

(65) Prior Publication Data
US 2014/0116560 A1 May 1, 2014

(30) Foreign Application Priority Data

Feb. 28, 2011 (JP) .................................. 2011-042602
Feb. 9, 2012 (JP) .................................. 2012-025825

(51) Int. Cl.
*F16L 15/00* (2006.01)
*F16L 15/06* (2006.01)
*E21B 17/042* (2006.01)

(52) U.S. Cl.
CPC ............ *F16L 15/00* (2013.01); *E21B 17/042* (2013.01); *F16L 15/001* (2013.01); *F16L 15/06* (2013.01)

(58) Field of Classification Search
CPC ....... F16L 17/08; F16L 17/085; F16L 15/007; F16L 15/004; F16L 15/002
(Continued)

(56) References Cited

U.S. PATENT DOCUMENTS 2,992,019 A * 7/1961 Macarthur .......... E21B 17/0423
285/334
4,009,893 A * 3/1977 Schatton ................. F16L 15/04
285/334
(Continued)

FOREIGN PATENT DOCUMENTS

DE 4446806 C1 5/1996
EP 1754920 A1 2/2007
(Continued)

OTHER PUBLICATIONS

Apr. 3, 2012 Search Report issued in International Patent Application No. PCT/JP2012/055292 (with translation).
(Continued)

*Primary Examiner* — David E Bochna
(74) *Attorney, Agent, or Firm* — Oliff PLC (57) ABSTRACT

A threaded joint for steel pipes that includes a pin and a box. The pin has an externally threaded portion, a nose, and a shoulder portion. The box has an internally threaded portion, a sealing surface, and a shoulder portion. The outer circumferential surface of the nose of the pin has an outward convex curved shape, and the sealing surface of the box has a tapered shape. Additionally, the cross-sectional area of the pin at a seal point is 35% or more of the cross-sectional area of an original pipe portion corresponding to an unprocessed
(Continued)

portion of the pin, the seal point being a portion on the pin that first comes into contact with the sealing surface of the box when the pin and the box are joined.

5 Claims, 4 Drawing Sheets

(58) Field of Classification Search
USPC .................................................. 285/333, 334
See application file for complete search history.

(56) References Cited

U.S. PATENT DOCUMENTS

| | | | | |
|---|---|---|---|---|
| 4,384,737 | A | * | 5/1983 | Reusser ............... F16L 15/004 285/334 |
| 4,501,443 | A | * | 2/1985 | Haring .................. F16L 15/04 285/334 |
| 4,611,838 | A | * | 9/1986 | Heilmann ............ F16L 15/04 285/334 |
| 4,623,173 | A | * | 11/1986 | Handa .................. F16L 15/004 285/333 |
| 4,692,988 | A | * | 9/1987 | Shulver ................. F16B 33/06 285/334 |
| 4,795,200 | A | | 1/1989 | Tung |
| 4,958,862 | A | * | 9/1990 | Cappelli ............. F16L 15/004 285/334 |
| 4,984,829 | A | | 1/1991 | Saigo et al. |
| 5,029,906 | A | * | 7/1991 | Chelette ............... E21B 17/042 285/334 |
| 5,338,074 | A | * | 8/1994 | Barringer ............. F16L 15/004 285/334 |
| 6,056,324 | A | * | 5/2000 | Reimert ............... E21B 17/042 285/334 |
| 2005/0248153 | A1 | | 11/2005 | Sugino et al. |
| 2008/0191479 | A1 | | 8/2008 | Suzuki |
| 2011/0025051 | A1 | | 2/2011 | Yamaguchi et al. |
| 2013/0181442 | A1 | * | 7/2013 | Sonobe ................ E21B 17/042 285/333 |

FOREIGN PATENT DOCUMENTS

| | | |
|---|---|---|
| EP | 2589846 A1 | 5/2013 |
| JP | A 61-44068 | 3/1986 |
| JP | A 2005-351324 | 12/2005 |
| JP | A 2006-526747 | 11/2006 |
| JP | A 2011-501075 | 1/2011 |

OTHER PUBLICATIONS

Apr. 8, 2016 Extended European Search Report issued in European Patent Application No. 12752067.4.
Jun. 16, 2015 Office Action issued in Japanese Patent Application No. 2012-025825.

* cited by examiner

FIG. 1

$S_1/S_0*100 \geq 35$ (%)

JOINT AXIS

FIG. 5

SIZE: 5-1/2"×23.0#, GRADE: 110ksi

THREADED JOINT FOR PIPES

TECHNICAL FIELD

The present invention relates to threaded joints for steel pipes and, more specifically, to a threaded joint for steel pipes having high sealability and high compression resistance suitable for use in connecting oil well pipes including tubing and casing for use generally in prospecting for oil wells and gas wells and in production, that is, steel pipes, such as oil country tubular goods (OCTG), riser pipes, and line pipes.

BACKGROUND ART

Threaded joints are widely used in connecting steel pipes, such as oil well pipes, for use in oil and gas production facilities. For connection of steel pipes for use in oil or gas prospecting and production, standard threaded joints based on the American Petroleum Institute (API) standard have been typically used. However, because crude oil wells and natural gas wells have recently increased in depth, and horizontal wells, directional wells and so on have increased more than vertical wells, excavation and production environments are becoming severe. Furthermore, an increase in well development under hostile environments, such as the sea and polar regions, diversifies performance requirements for threaded joints, such as compression resistance, bending resistance, and external pressure sealing performance (external pressure resistance). This therefore increases the use of special high-performance threaded joints called premium joints, thus increasing requirements for the performances.

The premium joint is generally a coupling-type joint in which an externally threaded member (hereinafter referred to as a pin) formed at an end of a pipe and an internally threaded member (hereinafter referred to as a box) that joints the pins together, the threaded members each including a tapered thread, a seal portion (specifically, a metal-to-metal seal portion), and a shoulder portion (specifically, a torque shoulder portion). The tapered thread is important to firmly secure the threaded joint, the seal portion functions to ensure sealability by the box and the pin coming into metal-to-metal contact at this portion, and the shoulder serves as a bearing face that acts as an abutment when the joint is made up.

Figure 6A:
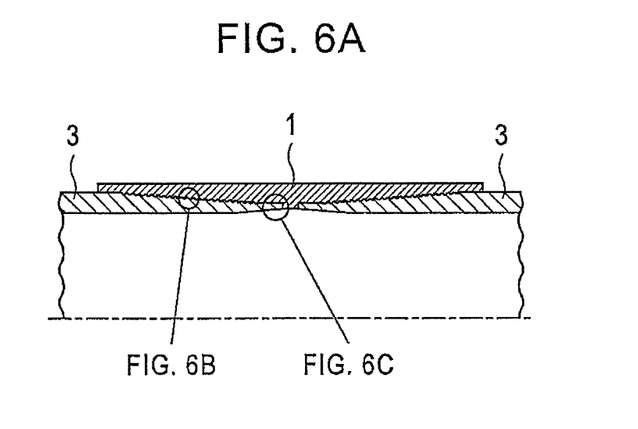
FIG. 6A is an overall cross-sectional view illustrating a conventional threaded joint for steel pipes.
Figure 6B:
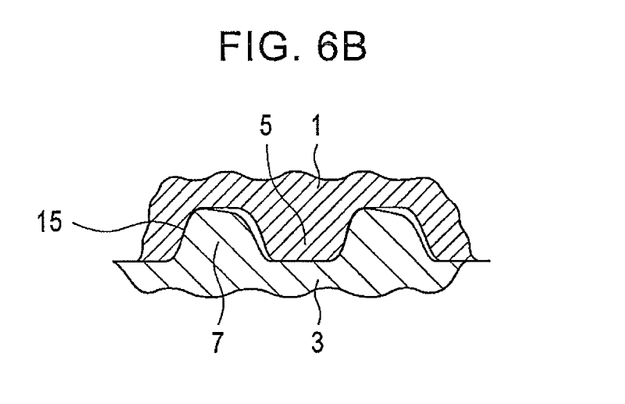
FIG. 6B is an enlarged cross-sectional view illustrating the threaded portions in FIG. 6A.
Figure 6C:
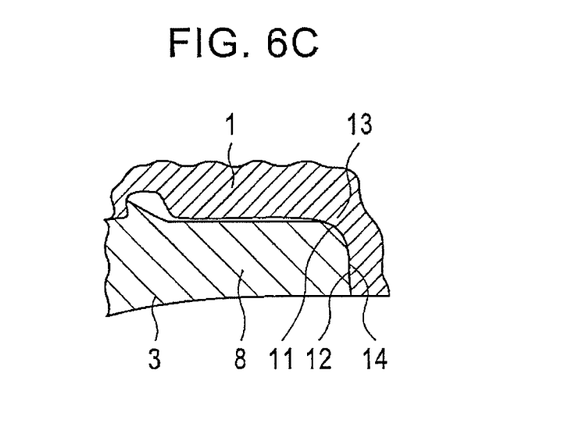
FIG. 6C is an enlarged cross-sectional view illustrating the vicinity of the pin nose in FIG. 6A.

FIGS. 6A to 6C are schematic explanatory diagrams of a conventional premium joint for oil well pipes, which are longitudinal cross-sectional views of a cylindrical threaded joint. The threaded joint in FIG. 6A includes pins 3 and a box 1 corresponding thereto. As shown in FIGS. 6B and 6C, the pins 3 each have an externally threaded portion 7 at the outer surface and a nose 8 (pin nose 8) at the distal end of the pin 3, the nose 8 being a no-threaded portion provided next to the externally threaded portion 7. The nose 8 has a seal portion 11 at the outer circumferential surface thereof and a torque shoulder portion 12 at the end face thereof. The opposing box 1 has, on the inner surface, an internally threaded portion 5, a seal portion 13, and a shoulder portion 14 which can be screwed on or come into contact with the externally threaded portion 7, the seal portion 11, and the shoulder portion 12 of the pin 3, respectively.

Patent Literature 1 is an example of the related art concerning the premium joint.

In the related art example in FIGS. 6A to 6C, the seal portion 11 is located at the distal end of the pin nose 8. Desired sealability can be achieved by applying a suitable make up torque.

Since the make up torque is influenced by lubrication conditions, surface properties, etc., a radial sealing method is proposed as a design that does not depend thereon to a large degree in which the radial component of seal contact pressure is relatively increased. For example; Patent Literature 1 discloses an example of the radial sealing method in which the pin has a large seal R shape and the box has a small seal taper angle. However, a problem of the radial sealing method in which the seal taper angle is reduced is that galling is prone to occur during make-up. In particular, in the case where a large seal interference amount is needed to ensure sealability and seal stability, the susceptibility to the occurrence of galling increases significantly.

CITATION LIST

Patent Literature

PTL 1: Japanese Examined Utility Model Registration Application Publication No. 61-44068

SUMMARY OF INVENTION

Technical Problem

Seal portions 11 and 13 in FIG. 6C or the seal portions of the radial sealing method (hereinafter referred to as a radial seal type) are given good seal portions without leak and galling when loaded with a necessary and sufficient contact pressure.

However, an analysis of the inventors shows that the threaded joint for steel pipes of the radial seal type has still room for improvement in ensuring sealability in terms of the rigidity of the pin nose. That is, the rigidity of the pin nose 8 is important to ensure the sealability of the radial seal type; a sufficient cross-sectional area is needed at a seal point sp (see FIG. 1, a portion of an outer circumferential surface of the nose 8 of the pin 3 at which the nose outer circumferential surface of the pin 3 and the inner circumferential surface of the opposing box 1 (hereinafter referred to as a sealing surface) first come into contact when threaded-joined). This is because a compressive load inversely proportional to the ratio of a pin cross-sectional area $S_1$ at the seal point sp to the cross-sectional area $S_0$ of an unprocessed portion (a portion corresponding to an unthreaded original pipe) acts at the seal point when axial compression acts, although most of the axial compression is received by the shoulder portion; however, if the ratio of the cross-sectional areas is not proper, plastic deformation due to the axial compression occurs also in the vicinity of the seal portion. This plastic deformation causes compression and bending deformation in the pin nose 8, thus decreasing the outside diameter of the pin 3 at the seal point sp. If the decrease is significant, the contact pressure of the seal portion 20 becomes insufficient, thus making it impossible to provide sufficient sealability. There were no findings concerning such problems and solutions in the past.

Solution to Problem

To solve the above problems, the inventors have found guidelines for achieving a proper ratio of the pin cross-sectional area at the seal point sp to the cross-sectional area of the unprocessed portion through various experimental examinations.

The inventors have further found that sufficient sealability can be provided by decreasing the deformation of the pin at the seal point sp when loaded with axial compression by setting an angle formed by a straight line connecting the position of the seal point sp in the pipe axial cross section of the pin and the inside end of the pin shoulder and the joint axis direction in a specific range.

Specifically, the present invention is as follows:

(1)

A threaded joint for steel pipes, comprising:

a pin including an externally threaded portion, a nose extending from the externally threaded portion to a pipe end, and a shoulder portion provided at a distal end of the nose; and a box including an internally threaded portion that is threaded-joined to the externally threaded portion to form a threaded portion, a sealing surface facing the outer circumferential surface of the nose of the pin, and a shoulder portion in contact with the shoulder portion of the pin, wherein the pin and the box are threaded-joined so that the outer circumferential surface of the nose of the pin and the sealing surface of the box are brought into metal-to-metal contact, and the contact portion serves as a seal portion, wherein the outer circumferential surface of the nose of the pin has an outward convex curved shape, and the sealing surface of the box has a tapered shape; and the cross-sectional area of the pin at a seal point that is a portion on the outer circumferential surface of the nose of the pin, the portion first coming into contact with the sealing surface of the box when threaded-joined, is 35% or more of the cross-sectional area of an original pipe portion corresponding to an unprocessed portion.

(2)

The threaded joint described in (1), wherein the position of the seal point is set so that a straight line connecting an inside end of the shoulder portion of the pin and the seal point in joint axial cross-sectional view forms an angle less than 45 degrees with respect to the joint axis.

Advantageous Effects of Invention

The present invention provides a threaded joint for steel pipes in which the rigidity of the pin nose is improved so that reduction in the outside diameter of the pin nose due to compression and bending deformation hardly occurs even under large axial compression, and thus high sealability is provided.

Furthermore, even if the outside diameter of the pin nose is reduced due to axial compression, the influence on the seal portion can be prevented by setting the seal point at a proper position, and thus higher sealability can be provided.

DESCRIPTION OF EMBODIMENT

Figure 1:
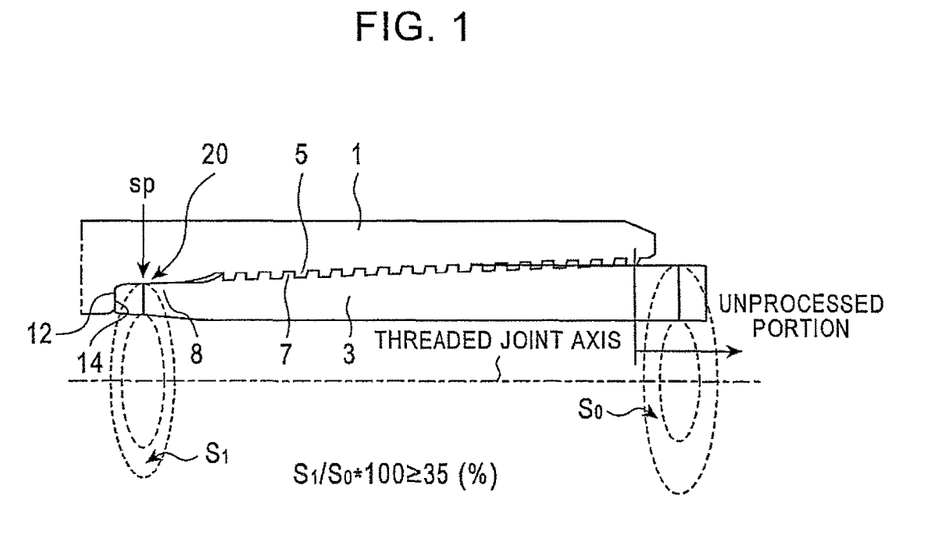
FIG. 1 is a joint-axis cross-sectional view of an embodiment of the present invention.
Figure 2:
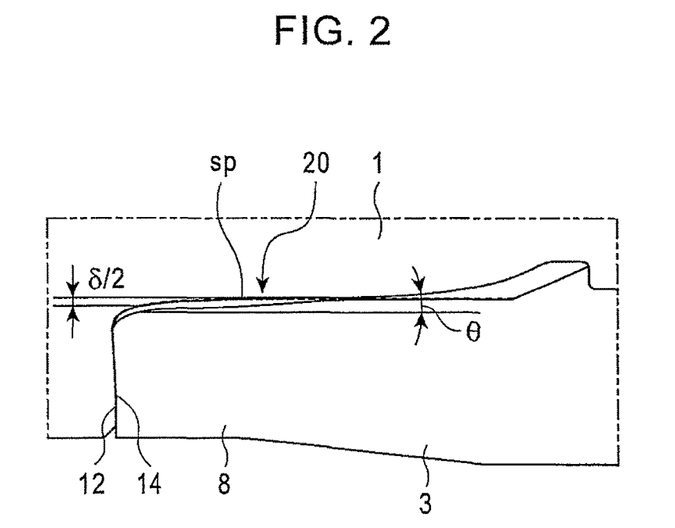
FIG. 2 is an enlarged cross-sectional view illustrating the shape of the seal portion in FIG. 1 together with the definitions of a seal taper angle θ and a seal interference amount δ.

As shown in the joint-axis cross-sectional views in FIGS. 1 and 2, a threaded joint for steel pipes according to the present invention assumes to be a threaded joint for steel pipes (a threaded joint equivalent to a conventional radial seal type premium joint in which the seal taper angle θ of the box 1 is 3 degrees or more and 10 degrees or less) including a pin 3 having an externally threaded portion 7, a nose 8 extending from the externally threaded portion 7 to an end of the pipe, and a shoulder portion 12 provided at the distal end of the nose 8; and a box 1 having an internally threaded portion 5 that is threaded-joined with the externally threaded portion 7 to form a threaded portion, a sealing surface facing the outer circumferential surface of the nose 8 of the pin 3, and a shoulder portion 14 in contact with the shoulder portion 12 of the pin 3; and the pin 3 and the box 1 are threaded-joined, so that the outer circumferential surface of the nose 8 of the pin 3 and the sealing surface of the box 1 are brought into metal-to-metal contact with each other, and the contact portion serves as a seal portion 20.

Figure 3A:
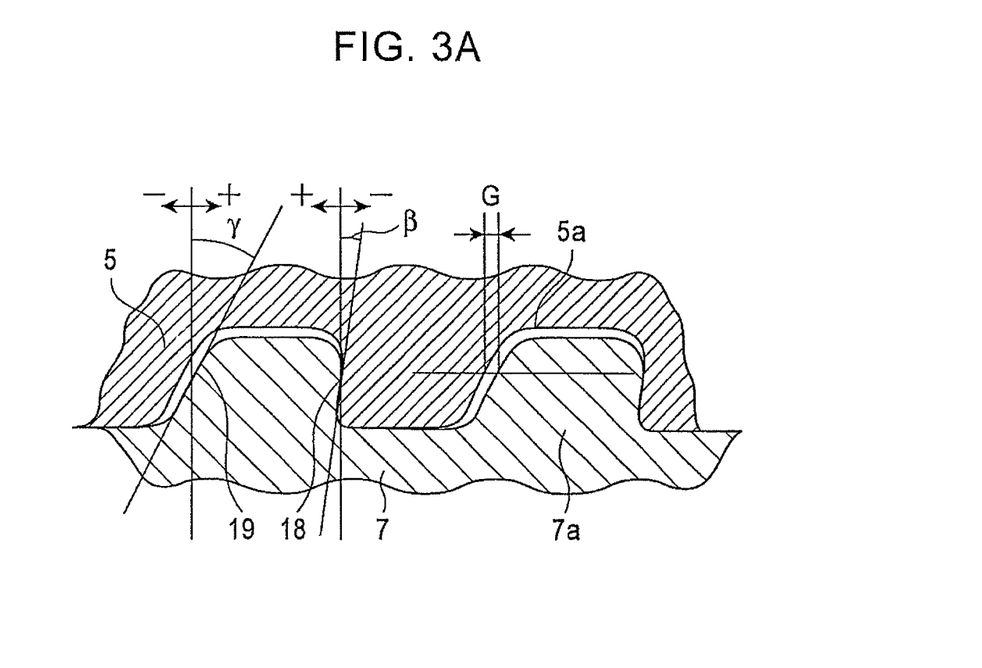
FIG. 3A is a cross-sectional view illustrating the definitions of a load flank angle β, a stabbing flank angle γ, and the gap G between threaded portions.

The foregoing threaded joint uses a load flank angle β, a stabbing flank angle γ, and the gap G between the threaded portions defined in FIG. 3A as shape parameters of the threaded portion.

The load flank angle β is an angle β that a load flank surface 18 forms with a line orthogonal to the threaded joint axis. If the upper end of the load flank surface 18 (a pin outside end) is located close to the distal end of the pin 3 relative to the orthogonal line passing through the lower end of the load flank surface 18 (a pin inside end), the load flank angle β is positive, and if it is located close to the trailing end of the pin 3, the load flank angle β is negative. The angle β is generally set to be equal to −10 degree to 0 degree.

The stabbing flank angle γ is an angle γ that a stabbing flank surface 19 forms with a line orthogonal to the threaded joint axis. If the upper end of the stabbing flank surface 19 (a pin outside end) is located close to the distal end of the pin 3 relative to the orthogonal line passing through the lower end of the stabbing flank surface 19 (a pin inside end), the stabbing flank angle γ is negative, and if it is located close to the trailing end of the pin 3, the stabbing flank angle γ is positive. The angle γ is generally set to be equal to 10 degrees to 30 degrees.

The gap G between the threaded portions is a gap G between the thread ridge 7a of the externally threaded portion 7 and the thread groove 5a of the internally threaded portion 5 that engages therewith. The gap G is generally set to be equal to 0.025 mm to 0.250 mm.

As shown in FIG. 2, on the assumption in the present invention, the outer circumferential surface of the nose 8 of the pin 3 has an outward convex curved shape, and the sealing surface of the box 1 has a tapered shape. The taper angle θ of the tapered surface is defined as an angle θ that the tapered surface forms with the threaded joint axis. The seal point sp refers to a portion on the nose outer circumferential surface of the pin 3, which first comes into contact with the sealing surface of the box 1 when threaded-joined.

Figure 3B:
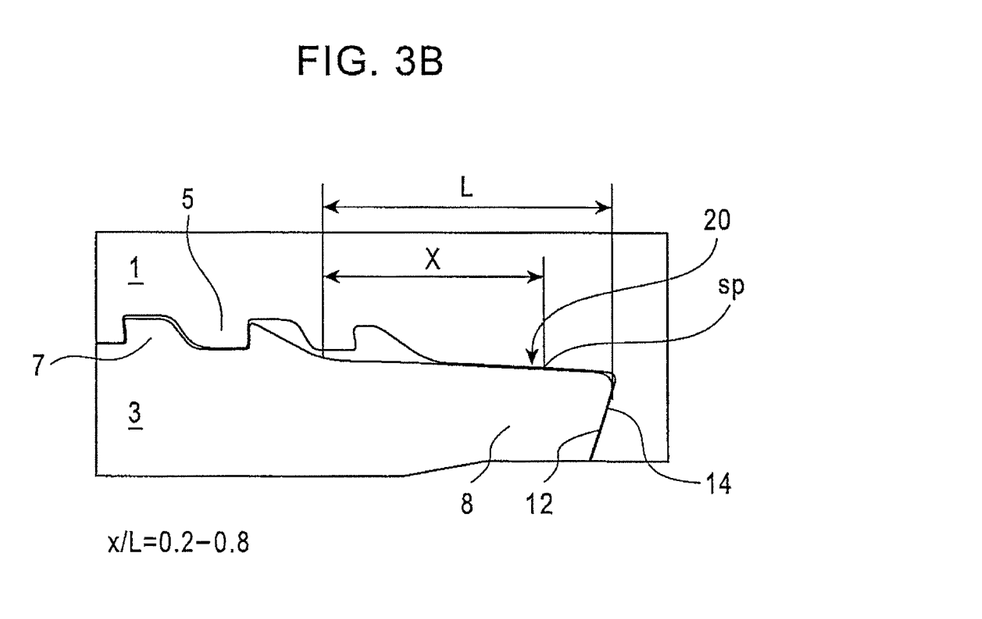
FIG. 3B is a cross-sectional view illustrating the definitions of the positional index x/L of a seal point sp.

As shown in FIG. 3B, the relative position of the seal point sp in the threaded joint axial direction is expressed by the positional index x/L of the seal point sp defined by a distance x from the thread distal end (nose trailing end) to the seal point sp relative to the length of the nose 8 (nose length) L from the thread distal end (nose trailing end) to the nose distal end.

In FIG. 2, sign δ denotes a seal interference amount at the seal portion 20. The seal interference amount δ is the value of pipe shrinkage when the seal point sp is reduced in diameter reduction to the rigid box 1.

As shown in FIG. 1, the present invention is characterized in that the cross-sectional area (the area of a cross section orthogonal to the joint axis direction) $S_1$ of the pin 3 at the seal point sp is larger than or equal to 35% of the cross-sectional area (the area of a cross section orthogonal to the joint axis direction) $S_0$ of the original pipe portion corresponding to an unprocessed portion, that is, a cross-sectional area ratio $S_1/S_0*100 \geq 35(\%)$.

The setting of the cross-sectional area ratio $S_1/S_0*100 \geq 35$ (%) improves the compression resistance of the seal portion 20 and makes it difficult to cause outside diameter shrinkage of the pin nose 8 even under large axial compression, thus providing high sealability. If the cross-sectional area $S_1$ of the radial seal type threaded joint is less than 35% of the cross-sectional area of the original pipe portion, it is impossible to provide a desired level of contact pressure area (an index of a contact pressure integrated value across the contact length). To obtain more sufficient compression resistance, it is preferable that the cross-sectional area ratio $S_1/S_0*100 \geq 40(\%)$.

Although the upper limit of the cross-sectional area ratio $S_1/S_0*100$ is not particularly limited, the upper limit is about 70% for a thickness/outside diameter of about 7% to 8% in consideration of a tapered thread processing space and a seal processing space. In the present invention, preferably, the seal taper angle θ of the box 1 is 10 degrees or less, and more preferably, 7 degrees or less, and still more preferably, 5 degrees or less to prevent the diameter reduction of the pin nose more efficiently.

Furthermore, in the present invention, preferably, the seal point positional index x/L is between 0.2 and 0.8, Specifically, 0.8 or less is preferable in the viewpoint of separating the seal portion 20 from the distal end of the nose 8 to improve external pressure resistance and tension resistance and providing stable performance to the thread. On the other hand, 0.2 or more is preferable because an index of less than 0.2 makes the interference between the seal portion and the threaded portion prone to occur during make-up (MU) at thread-joining. For further safety, 0.3 or more is more preferable.

Figure 4:
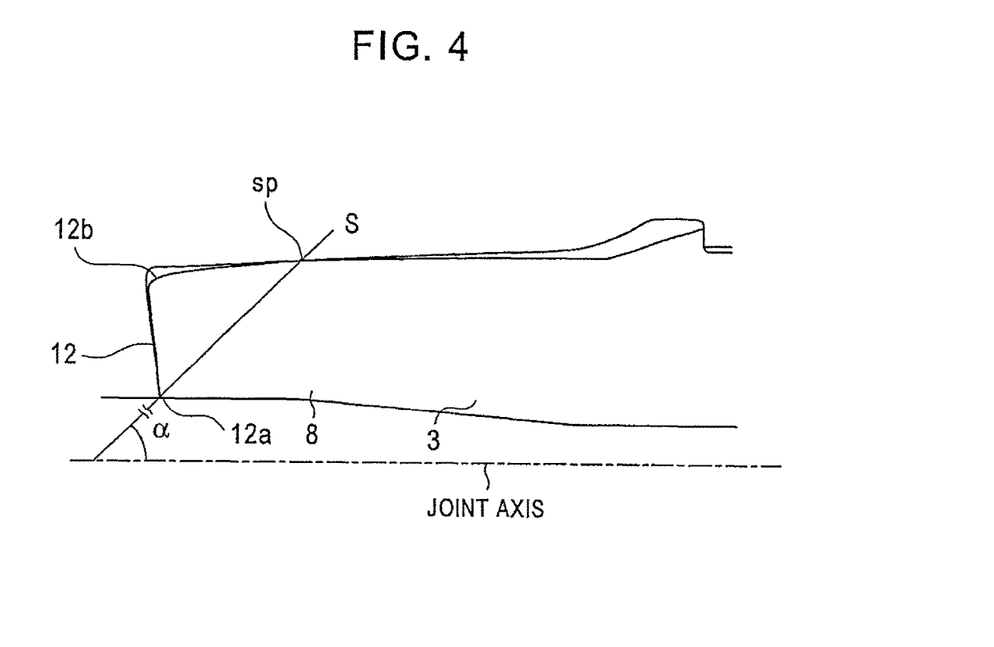
FIG. 4 is a joint-axis cross-sectional view illustrating an angle α that a straight line connecting the inside end of the shoulder portion of the pin and the seal point forms with the joint axis.

As shown in FIG. 4, preferably, the position of the seal point sp is set so that an angle α that a straight line S connecting an inside end 12a of the shoulder portion 12 of the pin 3 and the seal point sp in pipe axial cross-sectional view forms with the joint axis is less than 45 degrees. Since the present invention is configured to receive most of axial compression with the shoulder portion 12, it is inevitable that plastic deformation occurs at the distal end of the pin 3 if large axial compression acts. Because the plastic deformation advances in the direction of 45 degrees, which is a shearing direction, the influence of the plastic deformation of the shoulder portion 12 on the seal portion can be reduced, and thus sufficient sealability can be provide by setting the inclination of the straight line S connecting the inside end 12a of the shoulder portion 12 and the seal point sp with respect to the joint axis (a direction in which axial compression is loaded) to less than 45 degrees. Here, the angle α is practically set at 15 degrees or more. Setting the angle α to be extremely small will decrease the thickness of the distal end of the pin 3 too much, thus posing the problem of plastic deformation and buckling. Designs at less than 15 degrees are impossible in terms of sufficient thickness at the distal end and the limitation to the position of the seal point sp described above. The inventors analyzed an equivalent plastic, strain distribution after a combined load test defined by ISO test (ISO13679: 2002) by a finite element analysis (FEA) and found that large plastic deformation occurs in the pin 3 at the inside end 12a and an outside end 12b of the shoulder portion 12, as shown in FIG. 5, and the deformation generated at the inside end 12a advances in the direction of 45 degrees with respect to the joint axis direction, which is a shearing direction, and the equivalent plastic strain is larger at the distal end relative to a position Q at which the straight line extending at an angle of 45 degrees to the joint axis from the inside end 12a and the outer circumferential surface of the nose 8 intersect than that at the trailing end (at the externally threaded portion 7 side).

Figure 5:
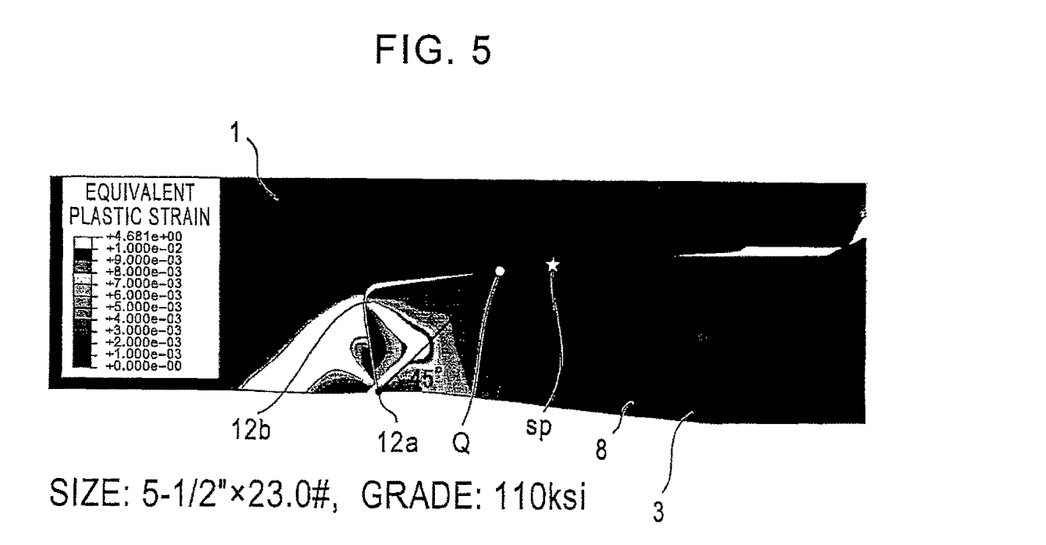
FIG. 5 is a contour plot illustrating the result of a finite element analysis (FEA) on an equivalent plastic strain distribution after a combined load test.

FIG. 5 shows the result of an analysis on a threaded joint including a pin formed at an end of a steel pipe of type P110 with an outside diameter of 5½ inches and a wall thickness of 0.415 inch and a box corresponding thereto under the load schedule of a series A test under a von Mises equivalent stress (VME) of 95% and a compression rate of 95%.

Accordingly, by disposing the seal point sp at a position nearer to the trailing end than the position Q at which the straight line S extending from the inside end 12a at 45 degrees with respect to the joint axis and the outer circumferential surface of the nose 8 intersect, that is, by setting the seal point sp so that the angle α (see FIG. 4) that the straight line S connecting the inside end 12a of the shoulder portion 12 of the pin 3 and the seal point sp forms with the joint axis is less than 45° degrees, deformation at the seal point sp under axial compression can be prevented, and hence higher sealability can be provided even after compressive force is loaded.

The load flank angle β, the stabbing flank angle γ, and the gap G between the threaded portions are not particularly limited; the common values can be employed.

EXAMPLES

A series A test based on ISO 13679 was conducted on samples of a threaded joint including a pin formed at an end of a steel pipe with an outside diameter of 9+⅝ inches and a wall thickness of 0.545 inch and a box corresponding thereto, which are designed to have the same contact pressure area (an index of a contact pressure integrated value across the contact length in the axial direction) after make-up (MU) by a finite element analysis (FEA). The test was conducted at the individual levels under the experimental conditions shown in Table 1. Experimental conditions not shown in Table 1 are the load flank angle β=−5 degree, the stabbing flank angle γ=25 degrees, and the gap G between the threaded portions G=0.06 mm for all the levels. The seal-point positional index x/L was designed to be within the range of 0.5 to 0.8.

This test evaluates the sealability under the combined load of tensile force/compressive force and internal pressure/external pressure in the series A test, and the load schedule is defined by a VME of 95% and API collapse pressure. The maximum compression rate (the ratio of loaded maximum compression stress to yield stress YS) is freely set by the manufacturer and is determined depending on the performance of the threaded joint and customer request. In this test, the maximum compression rate is set at 80%. For threaded joints in which no leak occurred at the maximum compression rate of 80%, a seal test was performed at a maximum compression rate higher than 80%, and the upper limit of the maximum compression rate at which no leak occurs was obtained.

Under the conditions of Comparative Example 2 in which extremely large seal interference amount δ is needed to obtain a predetermined contact pressure area, galling occurred during a make & break test, and thus an experiment was conducted under the conditions of Comparative Example 2A in which the seal interference amount δ is reduced to the same level as that in Invention Example 2.

As shown in Table 1, it is evident that Invention Examples have high sealability.

A comparison between Invention Example 2 and Invention Example 6 shows that Invention Example 6 in which the angle α that the straight line S connecting the inside end 12*a* of the shoulder portion 12 of the pin 3 and the seal point sp forms with the joint axis is less than 45 degrees shows a higher upper limit of the maximum compression rate, thus providing higher compression resistance. Likewise, a comparison between Invention Example 3 and Invention Example 7 shows that Invention Example 7 in which the angle α is less than 45 degrees has higher compression resistance.

7*a* THREAD RIDGE OF EXTERNAL THREAD
8 NOSE (PIN NOSE)
11, 13, 20 SEAL PORTION (SPECIFICALLY, METAL-TO-METAL SEAL PORTION)
12, 14 SHOULDER PORTION (SPECIFICALLY, TORQUE SHOULDER PORTION)
18 LOAD FLANK SURFACE
19 STABBING FLANK SURFACE
L NOSE LENGTH
S STRAIGHT LINE CONNECTING INSIDE END 12*a* of SHOULDER PORTION 12 AND SEAL POINT sp
θ SEAL TAPER ANGLE
δ SEAL INTERFERENCE AMOUNT
sp SEAL POINT
α ANGLE THAT STRAIGHT LINE S FORMS WITH JOINT AXIS
β LOAD FLANK ANGLE
γ STABBING FLANK ANGLE
G GAP BETWEEN THREADED PORTIONS

The invention claimed is:
1. A threaded joint for steel pipes, comprising:
a pin that includes an externally threaded portion, a nose extending from the externally threaded portion to a pipe end, and a shoulder portion provided at a distal end of the nose, the externally threaded portion extending from an original pipe portion that includes an unprocessed portion having no threads, the unprocessed portion being adjacent to the externally threaded portion on a side of the externally threaded portion that is opposite the nose; and
a box that includes an internally threaded portion, a sealing surface, and a shoulder portion, wherein:

TABLE 1

| | Experimental Conditions | | | | | | |
|---|---|---|---|---|---|---|---|
| Level | Cross-sectional area ratio $S_1/S_0 \times 100$ (%) | α* (degree) | Seal taper angle of box θ (degree) | Seal interference amount (inch) | Contact pressure area after MU (psi · inch) | Upper limit of maximum compression rate at which no leak occurs (%) | Leak occurrence state in test under maximum compression ratio of 80% |
| Invention Example 1 | 35 | 50 | 10 | 0.035 | 6,000 | 80 | Acceptance because no leak occurred at any LP |
| Invention Example 2 | 35 | 60 | 5 | 0.033 | 6,000 | 80 | Acceptance because no leak occurred at any LP |
| Invention Example 3 | 40 | 50 | 10 | 0.030 | 6,000 | 90 | Acceptance because no leak occurred at any LP |
| Invention Example 4 | 40 | 60 | 5 | 0.028 | 6,000 | 90 | Acceptance because no leak occurred at any LP |
| Invention Example 5 | 45 | 50 | 5 | 0.025 | 6,000 | 95 | Acceptance because no leak occurred at any LP |
| Invention Example 6 | 35 | 40 | 5 | 0.033 | 6,000 | 90 | Acceptance because no leak occurred at any LP |
| Invention Example 7 | 40 | 44 | 10 | 0.030 | 6,000 | 95 | Acceptance because no leak occurred at any LP |
| Comparative Example 1 | 30 | 50 | 10 | 0.040 | 6,000 | — | Leak occurred at second LP2 (tensile force + internal pressure) |
| Comparative Example 2 | 20 | 60 | 5 | 0.050 | 6,000 | — | Galling occurred during make & break test |
| Comparative Example 2A | 20 | 70 | 5 | 0.033 | 4,000 | — | Leak occurred at first LP2 (tensile force + internal pressure) |
| Comparative Example 3 | 25 | 60 | 5 | 0.040 | 6,000 | — | Leak occurred at first LP14 (tensile force + external pressure) |
| Comparative Example 4 | 30 | 50 | 5 | 0.038 | 6,000 | — | Leak occurred at second LP2 (tensile force + internal pressure) |

*α: Angle that a straight line connecting the inside end of a shoulder portion and a seal point sp forms with the thread axis

REFERENCE SIGNS LIST

1 BOX
3 PIN
5 INTERNAL THREAD
5*a* THREAD GROOVE OF INTERNAL THREAD
7 EXTERNAL THREAD the pin and the box are configured to be joined together such that the internally threaded portion is attached to the externally threaded portion to form the threaded joint, when the internally threaded portion and the externally threaded portion form the threaded joint:
(i) the sealing surface faces an outer circumferential surface of the nose,
(ii) the shoulder portion of the pin is in contact with the shoulder portion of the box, and
(iii) the pin and the box are joined so that the outer circumferential surface of the nose and the sealing surface are in metal-to-metal contact thereby forming a seal portion, the seal portion including a seal point that is the first portion of the pin that comes into contact with the sealing surface when the internally threaded portion and the externally threaded portion are brought together to form the threaded joint, the outer circumferential surface of the nose has an outward convex curved shape, and the sealing surface has a tapered shape, the position of the seal point on the pin is set so that a straight line connecting an inside end of the shoulder portion of the pin and the seal point, in a joint axial cross-sectional view, forms an angle ($\alpha$) with respect to the joint axis such that angle ($\alpha$) is 15 degrees or more and less than 45 degrees, a cross-sectional area of the pin at the seal point is 35% or more of the cross-sectional area of the unprocessed portion, and a distance (x) from a thread distal end to the seal point relative to a length (L) of the nose from the thread distal end to a distal end of the nose is in the range from 0.2 to 0.8.

2. The threaded joint according to claim 1, wherein a seal taper angle ($\Theta$) of the box is 10 degrees or less.

3. The threaded joint according to claim 2, wherein the seal taper angle ($\Theta$) of the box is 7 degrees or less.

4. The threaded joint according to claim 2, wherein the seal taper angle ($\Theta$) of the box is 5 degrees or less.

5. The threaded joint according to claim 1, wherein a seal interference ($\delta$) amount is 0.635 mm or more and 1.27 mm or less, the seal interference ($\delta$) being a value of pipe shrinkage at the seal point.

* * * * *